ELECTRONIC SWITCHING TELEPHONE SYSTEM

Filed April 15, 1963 2 Sheets-Sheet 1

INVENTOR.
R. E. ARSENEAU
BY [signature]
ATTORNEY

Aug. 23, 1966 R. E. ARSENEAU 3,268,667

ELECTRONIC SWITCHING TELEPHONE SYSTEM

Filed April 15, 1963 2 Sheets-Sheet 2

United States Patent Office
3,268,667
Patented August 23, 1966

3,268,667
ELECTRONIC SWITCHING TELEPHONE SYSTEM

Roger E. Arseneau, Elk Grove Village, Ill., assignor to International Telephone and Telegraph Corporation, a corporation of Maryland Filed Apr. 15, 1963, Ser. No. 273,015
7 Claims. (Cl. 179—18)

This invention relates to electronic switching telephone systems and more particularly to trunk circuits for use in such systems.

Generally speaking, electronic switching systems include a network of crosspoints which provide many alternative paths from any network inlet to any network outlet. One particular type of network which offers the best prospects for revolutionizing the switching industry is sometimes called a current controlled, self-seeking network. The details of this type of network are shown in a co-pending U.S. patent application entitled "Electronic Switching Telephone System," Serial No. 17,003, filed March 23, 1960 by Virgle E. Porter, abandoned in favor of continuation application Serial No. 389,826, filed August 10, 1964, which has now become Patent No. 3,204,044. A telephone system utilizing this network is shown in another co-pending U.S. patent application entitled "Electronic Switching Telephone System," Serial No. 181,626, filed March 22, 1962 by Arseneau, Bereznak and Osborn, now Patent No. 3,221,105. Both of the two above identified inventions are assigned to the assignee of this invention.

Briefly, a "self-seeking" network is one comprising crosspoints having the ability to select themselves and thereby complete a particular one of many alternative paths between any two-end-marked points. Stated another way, no complicated in-network controls are required to select the path between any marked inlet and outlet. A "current controlled" network depends upon the current flow over a completed path to hold the connection. An absence of such current releases all unused crosspoints promptly after a path fails in its efforts to find its way through the network.

These current controlled, self-seeking networks are interposed between subscriber lines and connection controlling circuits, such as links, registers, and the like. The principle is that any one of many registers may be pre-assigned to serve the next call. Then, when that call occurs, a path finds its way from a calling line through the network to the assigned register. There, certain call functions are completed. For example, dial tone may be returned, dial pulses may be stored, and the called line circuit may be signaled. Next, other paths find their way from both the calling and called lines through the same current controlled, self-seeking network to an idle link. Thereafter, the link joins these other paths and a conversation follows.

The system described thus far has been used primarily as a branch exchange to interconnect subscriber lines within a relatively small service area. If it becomes desirable to use such a system in a larger area, it is necessary to provide some means for tying inter-office trunk lines into the private branch exchanges, usually these means are called "trunk circuits."

Accordingly, an object of this invention is to provide new and improved electronic switching telephone systems and more particularly to provide trunk circuits for tying branch exchanges into central office equipment.

Another object is to provide an electronic switching system which is fully compatible with existing switching systems.

Another object of the invention is to accomplish the above objects and still realize all of the economies that self-seeking networks offer.

In accordance with one aspect of this invention, each inter-office trunk terminates, in the electronic switching system, as a line circuit and a connection control circuit. When a trunk call comes into the electronic system, the trunk circuit functions as a line circuit and originates a call to a register in the same manner as a subscriber line originates a call. Thereafter, the call is completed locally in the usual manner. If an outgoing trunk call is originated, the trunk circuit functions as a link circuit and the call is extended through the electronic system to a trunk in the same manner as to a called line. Either way, the calls are completed during discrete time slots generated under the control of a time base generator.

The above mentioned and other features of this invention and the manner of obtaining them will become more apparent, and the invention itself will be best understood by reference to the following description of an embodiment of the invention taken in conjunction with the accompanying drawings, in which.

*Brief description*

Figures 1, 2, 4:
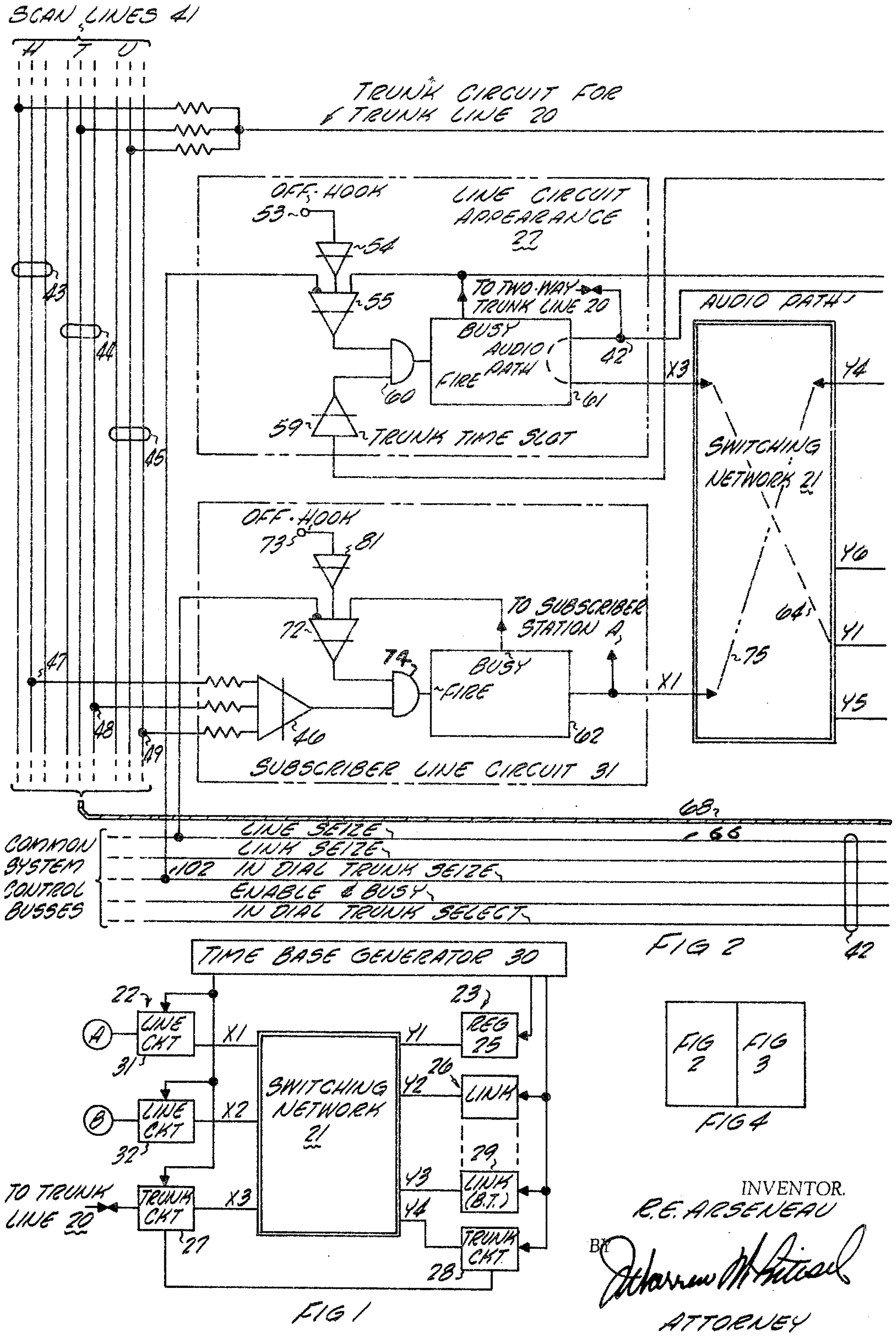
FIG. 1 is a block diagram showing an electronic switching telephone exchange constructed in accordance with the teaching of this invention.
FIGS. 2 and 3 are a logic circuit which shows details of the incoming trunk circuits.
FIG. 4 shows how FIGS. 2 and 3 should be joined to provide a complete and understandable circuit.

FIG. 1 shows an exemplary electronic switching telephone system connected to a distant office via a two-way trunk line 20. The major component of the system is a current controlled, self-seeking network 21 of the type shown in the above identified Porter patent. Subscriber line circuits 22 connect to one side of the network 21 at points marked with an X and connection control circuits 23 connect to the other side of the network at points marked with a Y. These connection control circuits include one or more registers 25 for controlling the extension of switch paths through the network, any number of link circuits 26 for selectively interconnecting calling and called subscriber lines, and trunk circuits 27, 28 for connecting the electronic switching exchange to the distant office. No attempt is made in FIG. 1 to illustrate all of the many kinds of link circuits which may be used. However, it should be understood that among other things, one of these links 29 includes sources of tones or other supervisory signals, such as a busy tone, for example.

Each circuit connected to the switching network 21 is identified by a time position signal in the output of a time base generator 30. In greater detail, the time base generator 30 provides a time slot pulse which identifies every circuit connected to the switching network 21 with regard to every other circuit like it which is also connected to the switching network. Thus, every subscriber line is identified by a cyclically recurring pulse in one series of pulses, every register by pulses in another series, and every link by pulses in yet another series.

During the appropriate time slot, the time base generator 30 produces a signal which enables each circuit to place a demand on the switching network 21. Thus, for example, if a demand is indicated at station A, the line circuit 31 applies an end-marking at point X1 for causing a path to fire through the network 21 during the time slot which identifies station A. Previously, an idle register circuit 25 was allotted to serve this particular call, and it placed a similar time slot controlled end-marking at point Y1 on the other side of the network. Thus, the path fires between these two end-markings through randomly selected crosspoints in the network 21. The established path is held by the same equipment that applies the end-marking. At the end of the particular time slot which identifies station A, during which the path fires through the network, the next line circuit 32 is provided with its time slot pulse to initiate another connection by placing an end-marking at point X2 if a demand is present on line B. If line B requires no action during that particular time slot, the end-marking is not applied to the network point X2.

The electronic switching system of FIG. 1 works this way. While idle and not processing a call, the register 25 marks its access point Y1 in the switching network 21 during its time slot. When a subscriber lifts a handset (such as at station A), another end marking appears at a point X1 on the other side of the network. Immediately, a transmission path is fired through the network and a connection is established under the control of the line circuit and the register. Upon seizure, the register 25 stores the calling number and returns dial tone. The subscriber at station A dials the number of the called line. After the called number is stored in the register, it releases the network connection to the calling line. When the register time slot next appears, the register stops the line scanner and starts the link scanner to locate an idle link. As each link time slot occurs, the identified link (if idle) applies an end-marking signal to its access point on the switching network. Simultaneously, the calling line applies an end-marking at the other side of the network. Almost instantaneously, a transmission path fires from the calling line circuit to the idle link circuit. Immediately thereafter, the register circuit causes the selected link circuit to mark another point on the network and a called line circuit to mark its access point on the network to cause a second path to fire between these two end-markings. After the second path is completed, the register is released and made free to serve another call. Thereafter, the switch paths through the network are held under control of the off-hook conditions of the telephone instruments of the two conversing subscribers.

If the register cannot complete the call within a predetermined period of time, the busy link circuit 29 is connected to the calling subscriber and busy tone is returned.

*Detailed description*

The exchange of FIG. 1 is connected to a distant telephone office via one or more two-way trunk lines 20. Each trunk line terminates at the switching network in both a line circuit appearance 27 and a link circuit appearance 28. This way, outgoing trunk calls are extended from subscriber lines through the network to the trunk line under the control of the link circuit appearance 28. Incoming trunk calls are extended from trunk 20 through the network to a subscriber line under control of the line circuit appearance 27. The manner in which these controls occur will become apparent from a study of the logic circuits of FIGS. 2 and 3.

Figure 3:
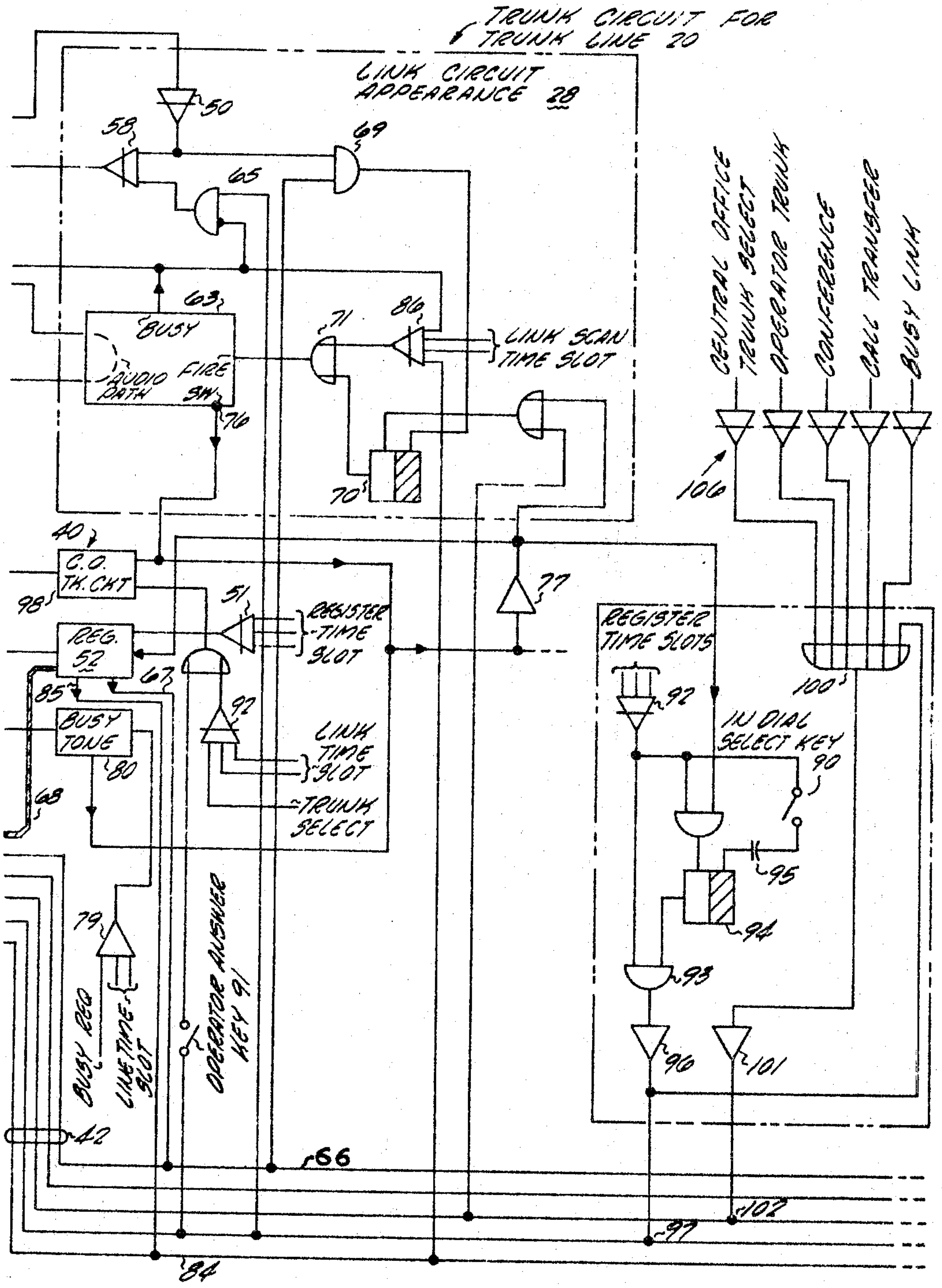

The major circuit assemblies of FIGS. 2 and 3 are a subscriber line circuit 31, the line circuit appearance 27 of the trunk line 20, the link circuit appearance 28 of the trunk, other connection controlling circuit 40, the switching network 21, a group of line scan busses 41, and common busses 42 which provide highways for extending connection control signals through the exchange. Most of these circuits have already been described in a rather broad manner in connection with the above description of FIG. 1. The remaining components of FIGS. 2 and 3 are shown by logic symbols of conventional form. Therefore, it is thought that the invention will be best understood from the following description of how calls are extended through the exchange.

*Incoming call*

An incoming call is defined as one originating in a distant office and extended over the trunk line 20 to FIGS. 2 and 3. For voice transmission purposes, the trunk line 20 connects to point 42 in the line circuit appearance 27 of FIG. 2.

Each line in the exchange (including trunk line 20) is identified by a simultaneous de-energization of an identifying combination of the line scan busses 41. These busses are here shown as divided into hundreds, tens, and units groups (43, 44, 45 respectively) to coincide with the hundreds, tens, and units digits of a subscriber line number. Thus, if the subscriber line circuit 31 has a directory number "233," for example, a NOR circuit 46 switches "on" during one time slot when all three of the line scan busses 47, 48, 49 are de-energized simultaneously. In like manner, during another time slot, the first hundreds, second tens, and second units busses are de-energized simultaneously; another NOT circuit 50 switches "on" to identify the trunk line. It should be noted that a single line identifying time slot identifies both line appearance 27 and link appearance 28. Of course, it should be clear that the scan busses could carry two-out-of-five, binomial, or other coding.

*Seizure.*—Assume that the time base generator 30 has de-energized each input to a NOR circuit 51, thus identifying the register 52 as that which will serve the next call. Register 52 applies an end-marking to network access point Y1. Further, assume that any suitable equipment has recognized a demand for service from the distant office by energizing an off-hook terminal 53 of an inter-office trunk line. Responsive thereto, a NOT circuit 54 switches "off" and de-energizes the middle input of a NOR circuit 55. The lefthand inhibiting input of this NOR circuit 55 has no function at this time. The righthand input is marked or energized only if the associated line or link circuit appearances 27 or 28 are busy. Such a busy marking would prevent the NOR circuit 55 from responding to the marking at "off-hook" terminal 53.

If the circuits 27, 28 are idle, the NOR gate 55 conducts. Nothing further happens until the time base generator de-energizes the combination of line scan busses 41 which are connected to the input of the NOT circuit 50. When this occurs, the NOT circuit 50 switches "on" to energize the upper input of a normally conducting NOR circuit 58 which switches "off." Responsive thereto, a normally non-conducting NOT circuit 59 switches "on" to energize the lowermost input of an AND gate 60. Since there is a demand for service, the upper input of the AND gate 60 is energized from NOR circuit 55. Thus, there is a coincidence, the AND gate 60 conducts, and any suitable logic equipment 61 applies an end marking or firing pulse to access point X3 on the switching network. The circuitry in block 61 (and other similar blocks 62, 63) is shown in a co-pending application entitled "Speech Path Controller," Serial No. 181,745, filed March 22, 1962, by R. E. Arseneau and assigned to the assignee of this invention.

Responsive to these end-markings, a path fires between the two end-marked points X3, Y1, such path being here shown by a dashed line 64. Immediately thereafter, the circuit 61 returns a busy signal to energize the righthand input of NOR circuit 55 and thereby inhibit further conductivity of the NOR circuit 55. This same busy marking energizes an inhibit gate 65 in the link appearance 28 of the trunk circuit for preventing an outgoing call from seizing the trunk line 20.

The register 52 is now in control of the incoming trunk call and proceeds to return a dial tone in any well known manner. Also, the register stores the calling number (i.e. an identification of the time slot during which path 64 fired through the network 20). Thus, the register remembers the identity of the trunk line 20 to which it is now connected.

*Connection to called line.*—Assume that the register 52 receives dial pulses indicating the directory number "233" which identifies the subscriber line circuit 31. The register circuit remains in an awaiting condition until its time slot pulse reappears, at which time NOR circuit 51 conducts. When circuit 51 conducts and register 52 stores a called number, the line seize bus 66 is energized via conductor 67. Simultaneously, the register 52 de-energizes certain ones of the busses in a cable 68 and the scan lines 41 to identify the trunk line 20. The NOT circuit 50 conducts, and there is a coincidence at AND circuit 69. This causes circuit 69 to switch the flip-flop 70 from its shaded to its unshaded side and energize the "FIRE" input of circuit 63 via an OR circuit 71. When this happens, an end-marking appears at point Y4 of network 21.

*Transfer of connection to link side appearance.*—It may be well to recall that a register stops line scanning when it is ready to complete a connection to a called line. Therefore, no other call may be extended through the network 21 at this time. Hence, no calling line, demanding service, can fire to point Y4 when the register applied end-marking appears. Also, the register 52 drops the original path 64 through the network.

The register 52 also causes the called line circuit 31 to end-mark the network 21 at point X1. In greater detail, when the register applies a marking over the line seize bus 66, it also de-energizes the scan busses 41 in a combination which identifies line circuit 31. The marking on bus 66 appears at an inhibit (the lefthand) terminal of the NOR circuit 72 and overrides any signals on the off-hook or middle input 73 of the NOR circuit 72. The combination of de-energized scan busses 41 causes NOR circuit 46 to conduct, and in turn, causes an AND gate 74 to conduct. When AND gate 74 conducts, an end-marking appears at point X1 on network 21. A path now fires through the network 21 over the dot-dashed line 75.

After the path 75 is completed from point X1 to point Y4, the link circuit appearance 28 applies a potential to its switch through terminal 76. Thereupon, a switch-through amplifier 77 conducts to re-set the flip-flop 70 to its shaded side, thus causing the allot potential to disappear from the firing terminal of the link circuit appearance of trunk line 20.

*Busy test.*—Next assume that the called subscriber line is busy when an attempt is made to complete the connection. The logic circuit 62 feeds a busy potential back to the righthand input of the NOR circuit 72 to prevent it from switching "on" when the line seizes bus 66 is energized from the register 52. Thus, there is no "and" function and AND circuit 74 does not conduct. No end-marking appears at the point X1, and register 52 can not complete a connection to the called line circuit 31.

After the register unsuccessfully attempts to complete a connection to the called subscriber line circuit 31 and such connection is not completed within a predetermined period of time, the time base generator 30 (FIG. 1) reaches a link time slot (gate 79 conducts) which indicates that a busy tone is required. Responsive thereto, circuit 80 applies an end-marking and a path fires from the point X3 to the point Y5, thus completing an audio path from the trunk line 20 to the busy tone circuit 80. Busy tone is now returned over the trunk line 20 to the distant calling office.

*Outgoing call*

To place an outgoing trunk call, a calling subscriber at station A lifts a handset to apply an off-hook marking to terminal 73 and a NOT circuit 81. Responsive thereto, the circuit 81 turns "off" and de-energizes the central input of NOR circuit 72. Nothing further happens until the calling subscriber's line circuit 31 time slot comes up at which time NOR circuit 46 conducts. There is a coincidence at AND circuit 74 and an end-marking potential appears at network access point X1. Also, a busy marking potential appears at the righthand input of the NOR circuit 72.

Assuming that the register 52 is idle, during its time slot an end-marking potential is standing at point Y1, and a path fires from point X1 to point Y1. The register 52 receives and stores the directory number of the calling subscriber line circuit 31, returns dial tone, receives and stores the called line directory number.

*Hunting for an idle trunk.*—Since this is an outgoing call, no trunk line has yet been assigned to it. Thus, the register 52 may seize any idle trunk line extending to the called office; or a need for trunk hunting is indicated.

To provide this function, the register 52 recognizes the need for hunting from the numerical value of the stored called number. Responsive thereto, register 52 de-energizes "INDIAL TRUNK SELECT" bus 84 via conductor 85. Therefore, the register de-energizes the lowermost input of a NOR circuit 86 in every trunk circuit identified by the called number. In each busy trunk circuit, the uppermost input to the NOR circuit 86 is energized to prevent it from switching "on." Next, the time base generator 30 (FIG. 1) scans the link circuit appearances 28, of all trunk circuits, by selectively de-energizing the middle two inputs of the NOR circuit 86. When a time slot of an idle trunk line appears, the NOR circuit 86 associated with that idle trunk line conducts to allot the link appearance 28 of that trunk. Then a path fires from the calling line circuit 31 through the network 21 to the network access point Y4 of the allotted trunk.

After the path is completed, the switchthrough point 76 is energized to cause the switchthrough amplifier 77 to turn "on," flip-flop 70 resets, and the sequence of logic functions advances. The calling subscriber line circuit 31 is now connected over trunk line 20 to the distant office, and the call may be completed there in any well known manner.

*Manual trunk calls*

The calls described thus far are extended under the control of subscriber transmitted dial pulses. Other types of trunk calls are extended under the manual control of an operator. For example, these calls may be to or from ringdown offices.

*Tandem call.*—To answer an incoming trunk call, an operator observes a lamp (not shown) or other call indicating signal and closes a common in-dial select key 90 and an answer key 91. Key 91 is individual to the trunk line carrying the incoming call.

A particular register time slot identifies an idle register when a manually controlled trunk call is extended through the exchange (FIGS. 2, 3). When this time slot of an idle register occurs, a NOR circuit 92 conducts and energizes the lefthand input of an AND circuit 93. Since key 90 is closed, the flip-flop 94 stands on its unshaded side to energize the righthand side of AND circuit 93. The capacitor 95 prevents the flip-flop from responding twice to one closure of key 90.

The output of AND circuit 93 energizes an amplifier 96 and an enable and busy bus 97. Since an individual, trunk identifying, key 91 is closed, one (among many) central office trunk circuits 98 is energized to apply an end-marking, firing potential at network access point Y6. The output from the amplifier 96 also feeds through an OR circuit 100 to pulse an amplifier 101 and thereby energize the INDIAL SEIZE BUS 102. Responsive thereto, the lefthand inhibit input of NOR circuit 55 is energized. This overrides any on-hook control at the central input of the NOR circuit 55. When the time slot of the line circuit appearance 27 appears, a firing potential is applied to the point X3. Now a path fires between the two end-marked points X3, Y6.

*Other features.*—In addition to the calls described thus far, it is sometimes desirable to provide other call functions such as call transfer, conference calls, and the like. If any of these other functions are required, either automatic equipment or an operator selects a corresponding connection control circuit 40, in any suitable manner. In addition, the equipment or operator de-energizes the input to any one of five NOT gates 106 to cause an output which switches the amplifier 101 "on" to energize the INDIAL SEIZE BUS 102. An energization of this bus causes the trunk circuit to allot and fire a new connection from point X3 to any other connection control circuits then marking a network point of access.

While the principles of the invention have been described above in connection with specific apparatus and applications, it is to be understood that this description is made only by way of example and not as a limitation on the scope of the invention.

I claim:

1. An electronic switching telephone system comprising a plurality of line circuits and a plurality of connection control circuits, a current controlled, self-seeking switching network, said line circuits being connected to one side of said network, said connection control circuits being connected to the other side of said network, a plurality of inter-office trunk lines, means for terminating each trunk line on both of said sides of said network in a line circuit appearance and a link circuit appearance, means comprising a time base generator for identifying each circuit connected to said network, means responsive to control signals from said time base generator for extending incoming trunk calls via the line side appearance of said trunk line through said network to one of said connection control circuits, and means also responsive to control signals from said time base generator for extending outgoing trunk calls from one of said line circuits through said network to said trunk via the link side appearance of said trunk.

2. The system of claim 1 wherein both the line and link side appearances of each trunk line are identified by the same control signals from said time base generator.

3. The system of claim 1 and means associated with said link side appearance for causing said system to hunt over said trunk lines in a search for an idle one of said trunks.

4. The system of claim 1 wherein at least some of said connection control circuits comprise registers, means responsive to the receipt of a trunk call for assigning an idle one of said registers to control the extension of a call connection through said network, and means responsive to controls from said one register for transferring said call connection from the appearance of a given trunk on one side of said network to the appearance of said given trunk on the other side of said network.

5. The system of claim 4 and a plurality of common busses extending through said system for transmitting signals from said one register to said line circuits and said connection control circuits to control the extension of said call connection.

6. An electronic switching telephone system comprising a current controlled, self-seeking switching network having line circuits connected to one side and connection control circuits connected to the other side, a plurality of inter-office trunk lines, each of said trunks terminated on both of said sides of said network, means for extending incoming trunk calls through the line side appearance of one of said trunks through said network over a first path to one of said connection control circuits, means for dropping said first path, and means responsive to signals from said one connection control circuit for extending a second call connection from the connection control side appearance of said trunk through said network to a called one of said line circuits.

7. The system of claim 6 wherein said one connection control circuit comprising a register, means responsive to said extension of said first path for storing an identification of said one trunk in said register, means responsive to dial pulses received over said trunk for identifying said one line circuit, and means responsive to the complete storage of said dial pulses in said register for causing said second call connection to extend through said network.

No references cited.

KATHLEEN H. CLAFFY, *Primary Examiner.*

WILLIAM C. COOPER, *Examiner.*